(12) United States Patent
Orsatti

(10) Patent No.: US 7,061,870 B2
(45) Date of Patent: Jun. 13, 2006

(54) METHOD AND SYSTEM OF TRANSMITTING LOOPBACK CELLS THROUGH A SWITCHING NODE OF AN ASYNCHRONOUS TRANSFER MODE (ATM) NETWORK

(75) Inventor: Daniel Orsatti, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 693 days.

(21) Appl. No.: 09/766,824

(22) Filed: Jan. 22, 2001

(65) Prior Publication Data

US 2001/0019553 A1    Sep. 6, 2001

(30) Foreign Application Priority Data

Feb. 22, 2000  (EP) ................................. 00480021

(51) Int. Cl.
*G01R 31/08* (2006.01)
(52) U.S. Cl. ..................... 370/241.1; 370/248; 370/249
(58) Field of Classification Search ............. 370/236.1, 370/236.2, 241.1, 395.2, 395.3, 248, 249
See application file for complete search history.

(56) References Cited

U.S. PATENT DOCUMENTS

| | | | | |
|---|---|---|---|---|
| 5,710,760 A | * | 1/1998 | Moll | 370/249 |
| 6,175,568 B1 | * | 1/2001 | Awdeh | 370/236.1 |
| 6,269,083 B1 | * | 7/2001 | Nagata et al. | 370/248 |
| 6,563,795 B1 | * | 5/2003 | Gruber et al. | 370/248 |
| 6,643,264 B1 | * | 11/2003 | Furusawa et al. | 370/236.1 |
| 6,724,728 B1 | * | 4/2004 | Manchester et al. | 370/236.2 |

* cited by examiner

*Primary Examiner*—Chau Nguyen
*Assistant Examiner*—Ian N. Moore
(74) *Attorney, Agent, or Firm*—Joscelyn G. Cockburn

(57) ABSTRACT

Method and system of transmitting a loopback cell of a connection established between a source ATM device and a destination ATM device of an ATM network, with the loopback cell being returned to one of the switching nodes located on the route used by the connection, and entering the switching node by a port of an adapter and going out of the switching node by the same port of the same adapter instead of another connected adapter used by normal cells of the connection. The method contain the steps of detecting in another connected adapter whether the incoming cell includes a loopback condition, and if so, appending to the incoming cell a specific routing label indicating that the incoming cell is a loopback cell to be returned on the connection so that the specific routing label is used by the protocol engine of another connected adapter for transferring said loopback cell to an input port of another connected adapter whereby the loopback cell is transmitted over the ATM network from the port of the first adapter.

11 Claims, 6 Drawing Sheets

METHOD AND SYSTEM OF TRANSMITTING LOOPBACK CELLS THROUGH A SWITCHING NODE OF AN ASYNCHRONOUS TRANSFER MODE (ATM) NETWORK

BACKGROUND OF THE INVENTION

1. Technical Field

The invention relates generally to an Asynchronous Transfer Mode (ATM) network wherein a connection is established between a source ATM device and a destination ATM device by the intermediary of a plurality of network switching nodes, and relates in particular to a method of returning loopback cells from the connection output adapter in one of the switching nodes located on the route used by the connection.

2. Description of the Related Art

The use of ATM switching nodes in an IP network has become one of the most attractive solutions since ATM hardware switches have been extensively studied and are widely available in many different architectures.

When a connection is established in an ATM network from a source ATM device to a destination ATM device by the intermediary of a plurality of switching nodes, the incoming cells to a switching node are automatically routed to the next switching node of the connection. For this, each cell is composed of an ATM header and of a payload. The ATM protocol engine of the switching node identifies the incoming ATM cell using a lookup table. In the case of a valid cell ("valid" meaning belonging to an existing connection), the protocol engine performs traffic management function (traffic policing, congestion management, priority management) and queues the cell in an appropriate queue. A scheduler using priority based scheduling procedures selects queues from which cells are to be transmitted. Those cells are removed from their queue. Prior to transmission, the protocol engine adds the following routing labels to the cell: the switch routing label (SRL) and the protocol engine correlator (PEC). The resulting internal cell format used within the switching node will be denominated hereafter as a "labeled" cell. The SRL contains either explicitly the destination blade or a pointer to a translation table located in the switching device and containing the explicit destination blade. The PEC is a pointer used by the protocol engine of the output adapter to identify the connection. The protocol engine in the output destination adapter receives the cell from the switching device. Similarly to the input protocol engine, it identifies the incoming cell by performing a lookup function on the appended protocol engine correlator, runs traffic management functions, queues the cell in the appropriate queues, removes the cell under control of a scheduler from the appropriate queue, removes the appended labels, swaps the ATM label and transmits the cell on the connection destination ATM port(s).

The ATM standards have defined Operation And Maintenance (OAM) procedures. These procedures are based on particular cells identified as OAM cells by means of particular values of the payload type indicator (PTI) field of the ATM cell header. Some of the OAM cells are called loopback cells. They can be either segment or end to end loopback cells and may possibly contain in their payload a source and a destination address indication. The ITU-T I610 specifications define the procedures to be performed by a network equipment when receiving OAM loopback cells. In particular, they define two loopback locations for a switching node, the input adapter and the output adapter, and the loopback condition algorithm using the cells parameters (source address, destination address, segment or end to end). These procedures, by allowing to loopback cells on a connection path at various locations (input or output adapter of the various switching nodes on the connection path) are used either to monitor the connection or for problem determination and failure isolation in the case of a failing connection.

When OAM cells such as loopback cells are received in a switching node of a connection, a classical way to process those cells would be to transmit the cells to a dedicated resource such as a local processor that would perform the OAM procedures. But, such a solution is not appropriate and is expensive inasmuch as it requires the incorporation of microprocessors on the adapter card of the switching node whereas the normal connection cells use ASIC modules which are data processing units specifically designed for the routing of the ATM cells.

SUMMARY OF THE INVENTION

The present invention relates to a method and system of transmitting a loopback cell of a connection established between a source ATM device and a destination ATM device of an ATM network, with the loopback cell being returned in one of the switching nodes located on the connection route, and with the loopback cell entering the switching node by a port P1 of adapter B1, the loopback cell being switched to the adapter B2 as normal cells of the connection, and being then switched backward to adapter B1 and exiting the switching node by the same port P1 of the same adapter B1 as output adapter instead of port P2 of adapter B2 as output adapter used by normal cells of the connection. The method comprises the steps of detecting in adapter B2 whether the incoming cell includes a loopback condition, and if so, appending to the incoming cell a specific routing label indicating that the incoming cell is a cell to be returned on the connection and using the routing label by the protocol engine of adapter B2 to transmit the cell over the switch engine to adapter B1, then over the ATM network from port P1 of adapter B1.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION OF THE PREFERRED EMBODIMENT

Figure 1:
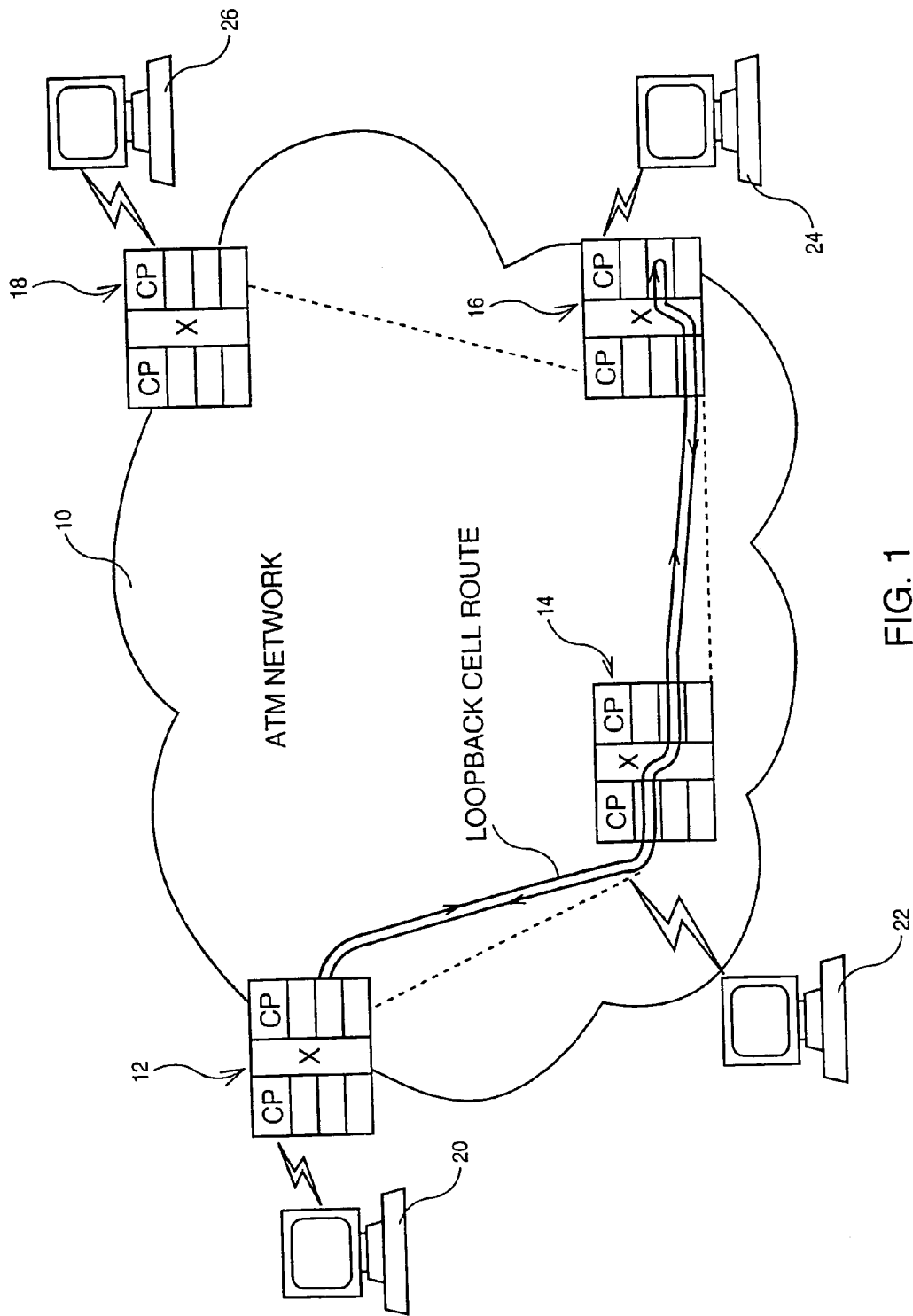
FIG. 1 represents a block diagram of an ATM network including several switching nodes through which a connection is established and in which the routing of a loopback cell according to the method of the present invention is schematically represented.

With reference to FIG. 1, an example of an ATM network 10 implementing the system according to the present invention, and comprising four switching nodes 12, 14, 16 and 18 being respectively connected to local consoles 20, 22, 24 and 26 is illustrated. Each switching node is comprised of a Control Point (CP) blade and a plurality of adapter blades, which provide the physical attachments to network devices such as the other switching nodes or the user workstations and a switch engine (X) providing cell switching between its ports on which are attached the adapter blades. The local console attached to the CP blade in each node is used for the network and control management. Note that each blade includes an input and an output adapters.

It is assumed that a connection in dotted lines depicted in FIG. 1 is established between the source switching node 12 and the destination switching node 18 through the intermediary switching nodes 14 and 16. For this connection, a cell inputs each switching node by an input adapter and outputs the switching node by an output adapter after being switched by the switch engine of the node to be transmitted to the output adapter as a normal connection cell. But, instead of being transmitted over the network, the loopback cell is transferred towards the input adapter of the switching node from which it is returned over the ATM network on the reverse path of the full duplex ATM connection.

Figure 2:
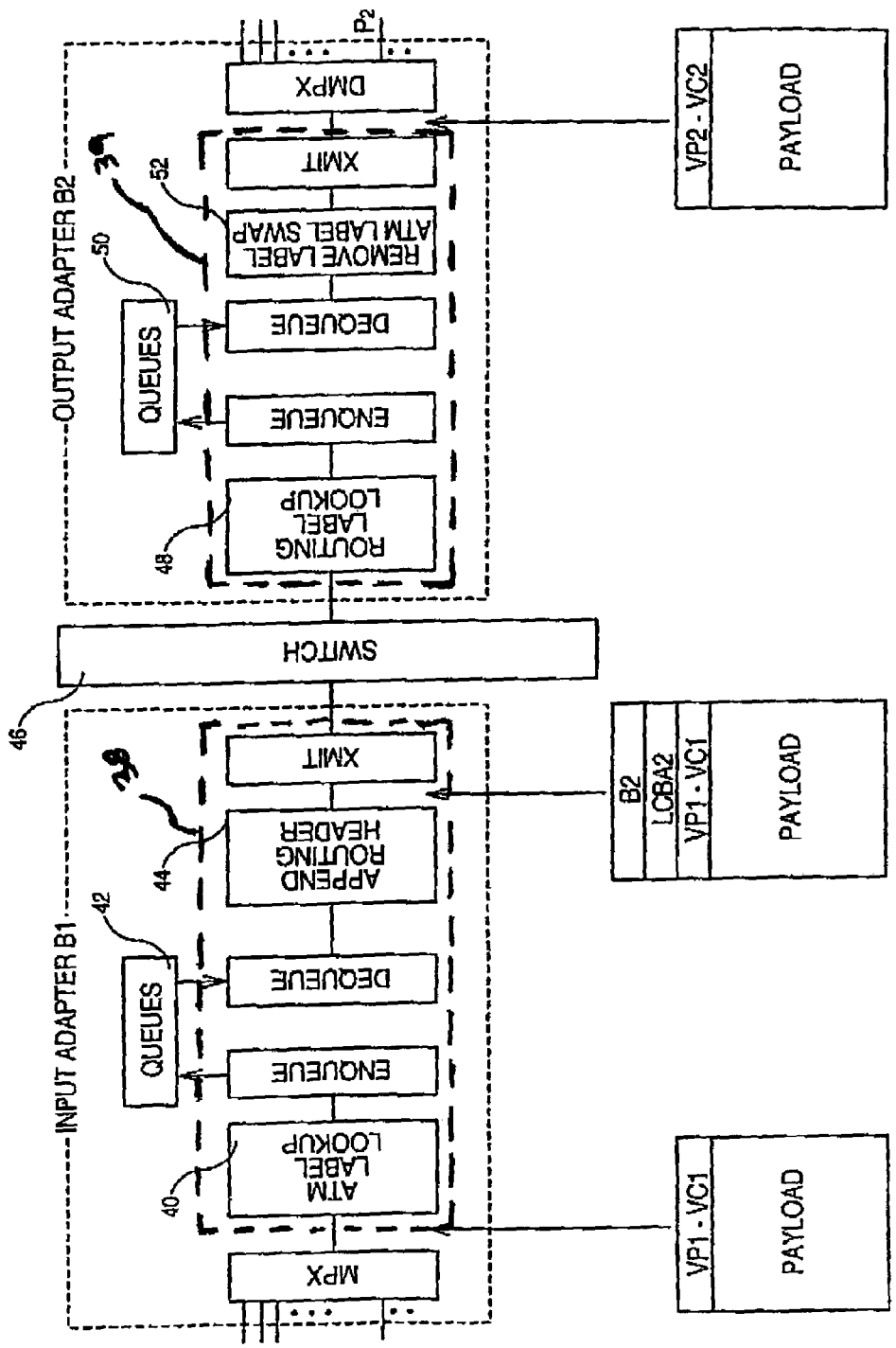
FIGS. 2 and 3 are block diagrams representing the two half duplex flows of an ATM connection cell between port P1 to port P2 of a switching node through which an ATM connection is established.

As illustrated in FIG. 2, the transfer of normal ATM cells through a switching node occurs as follows. The ATM cells of a given connection are received by a port P1 of the input adapter B1. They are composed of a ATM label VP1-VC1 (virtual path-virtual circuit) and a payload. First, the protocol engine 38 of adapter B1 identifies the incoming cell using the ATM label lookup 40. The lookup function is an address resolution performed on the source port P1 and the ATM label VP1-VC1. The lookup result is a pointer to the connection control block LCBA1 (leaf control block address). The connection control block contains the information necessary to process the incoming cell, that is information used to run the traffic management function and information used to forward the cell: a switch routing label SRL (B2) and a protocol engine correlator PEC which is the pointer in the output adapter used to perform the label swap (LCBA2). Then, the protocol engine 38 places the cell in an appropriate queue 42. A scheduler using priority based scheduling procedures selects the queue from which the cells are to be transmitted and removes those cells from the selected queue. Then, the append routing header function 44 appends the switch routing label B2 and the protocol engine correlator LCBA2 to the cell which is transmitted to switch engine 46.

Using the appended SRL B2, switch engine 46 transmits the cell to the output adapter B2. Similarly to the protocol engine 38 of the input adapter, the protocol engine 39 of the output adapter identifies the cell by performing a lookup on the appended PEC LCBA2 (48), runs traffic management functions, places the cell in the appropriate queue 50 and removes the cell under the control of a scheduler. Then, routing labels B2 and LCBA2 are removed by remove label function 52, and the ATM label is swapped to the new label pointed by LCBA2 in the connection control block, that is VP2-VC2. At last, the protocol engine 39 transmits the cell on destination port P2 also pointed by LCBA2 in the connection control block.

Figure 3:
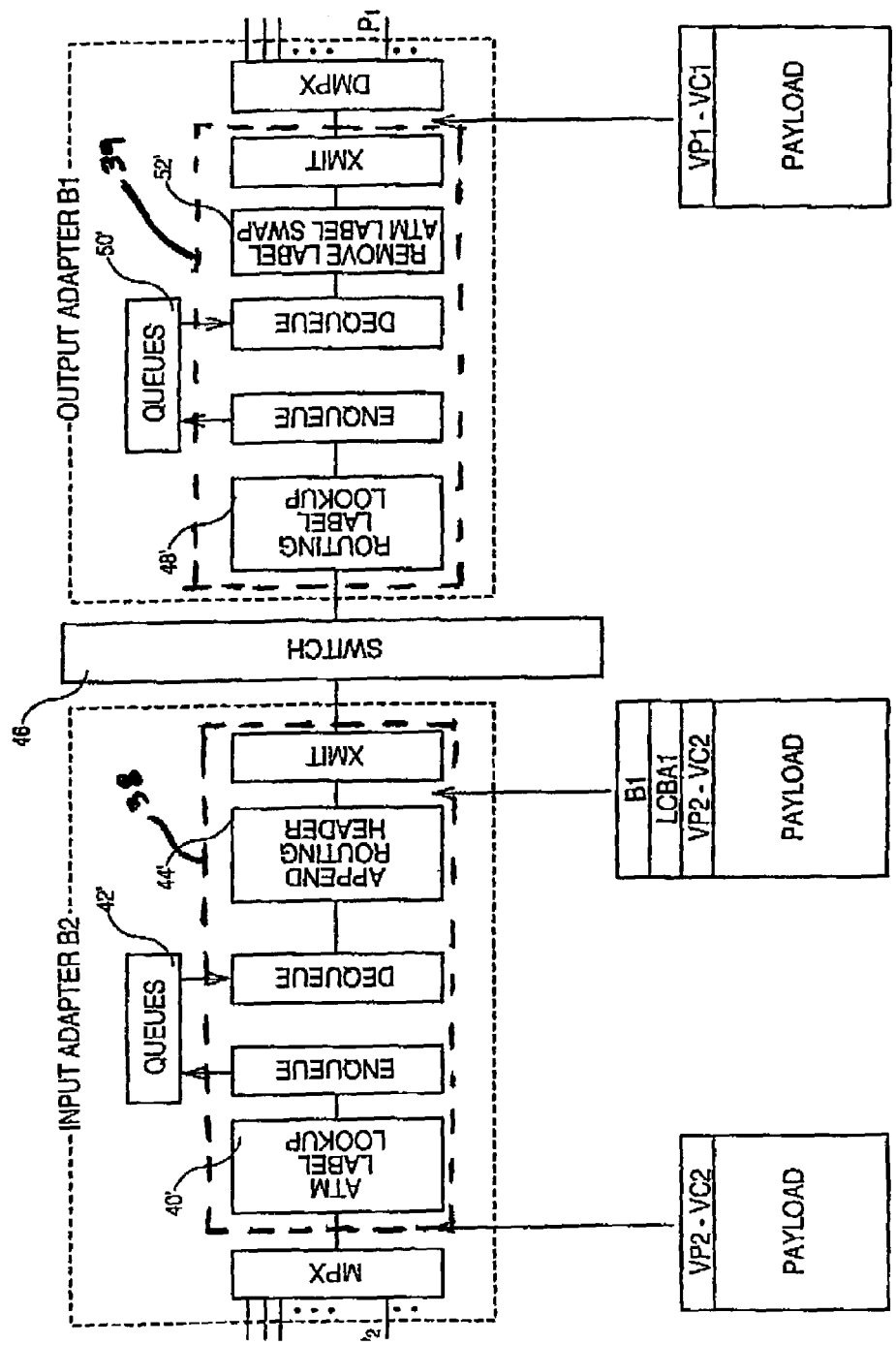

Reciprocally, when a cell is received by port P2 of input adapter B2, its ATM header is VP2-VC2 as illustrated in FIG. 3. The pointer to the connection control block resulting from the label lookup is the pointer LCBA2 which points in the control block to the switch routing label SRL B1 and the protocol engine correlator (PEC) LCBA1 used as pointer to the connection control block in output adapter B1. These two labels are appended to the cell before transmitting it to switch engine 46. Then, in output adapter B1, the routing labels are removed and the ATM header is swapped to VP1-VC1 given by pointer LBA2 in the connection control block of adapter B1.

It is clear from the above description that the connection control block pointers LCBA1-LCBA2 for the P1 to P2 half-duplex connection, are the same as connection control block pointers for the P2 to P1 half-duplex connection. Thus, the connection being full duplex, symmetrical operations are performed on the cell flow received by port P2 of adapter B2 and the cell flow received by port P1 of adapter B1. Such symmetrical operations are being used to achieve the invention as explained hereafter.

Figure 4:
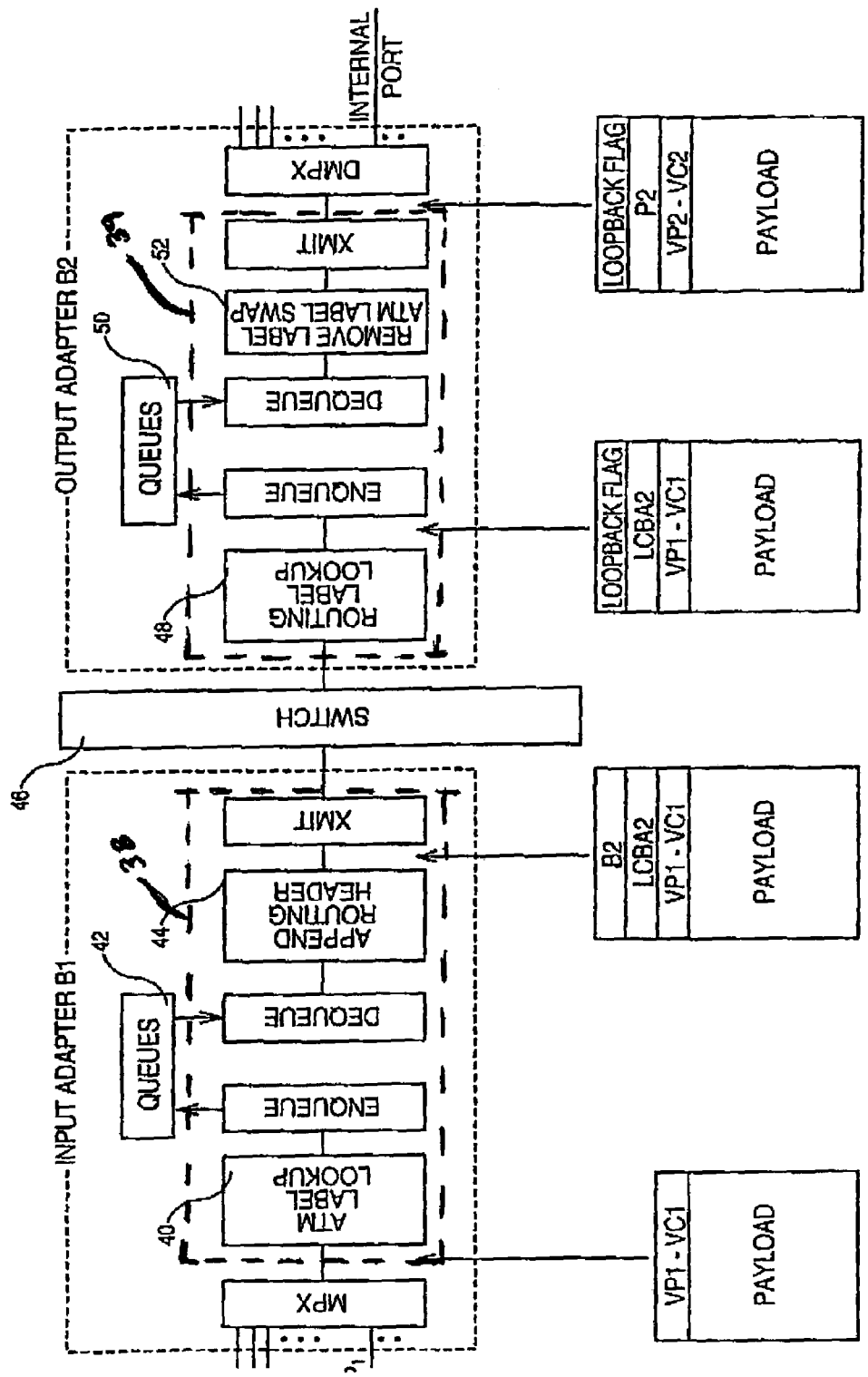
FIG. 4 is a block diagram representing the flow of a loopback cell from port P1 of an adapter B1 to the internal port of adapter B2 of the switching node according to the principles of the present invention.

It is assumed now that the incoming cell is a loopback cell to be transmitted to adapter B2 as illustrated in FIG. 4 before being returned towards adapter B1. In such a case, the incoming cell includes an indication that it is a loopback cell to be returned at the output of adapter B2 towards adapter B1 instead of being transmitted over the network from port P2 of adapter B2. Therefore, the processing of the cell is the same processing as for a normal connection cell explained in reference to FIG. 2 until the cell is switched by switch engine 46 towards adapter B2.

In output adapter B2, the protocol engine determines, using the OAM procedures, that the cell has to be returned and sets a loop condition bit in a specific register or in the cell buffer control block. At this stage, it is useful to mention that a loopback may not be allowed in the switching node being considered. For this, a loop control bit has to be set by the control point of the switching node in the connection control block for the loopback to be allowed. If the loop control bit is set, a loopback flag is added to the cell.

After the cell is placed in a selected queue 50 and dequeued, the remove label-Am label swap function 52 utilizes pointer LCBA2 to get from the connection control block the information used to forward the cell, that is the target port indication P2 and the new ATM label used to perform the label swap. Accordingly, the label VP1-VC1 is replaced in the cell by the label VP2-VC2 as ATM header, and in view of the loopback flag included in the cell, the pointer LCBA2 is replaced by the target port indication P2. Note that the above steps according to the method of the invention can be easily made either by hardware or by software.

Then, due to the loopback flag in the cell, this cell is not forwarded over the network on port P2 as a regular cell of the connection, but is transferred to an "internal port" which is a special port of adapter B2 established between the output part and the input part of adapter B2 used for loopback cells only, and the loopback flag is removed from the cell.

Figure 5:
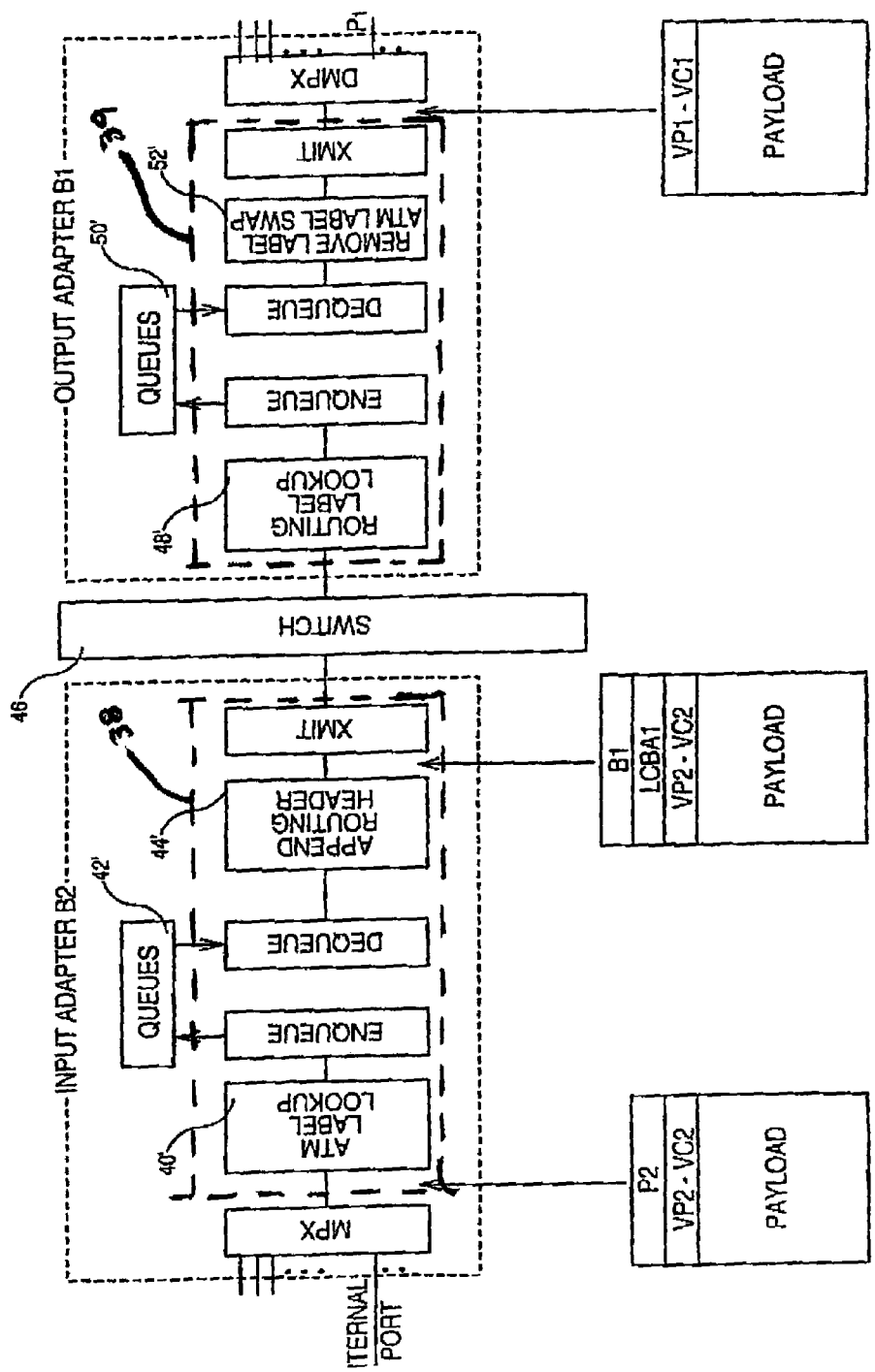
FIG. 5 is a block diagram representing the flow of a loopback cell from the internal port of adapter B2 to port P1 of adapter B1 of the switching node according to the principles of the present invention.

The internal port is in fact an input port for adapter B2 as illustrated in FIG. 5. But, insofar as the cell includes the label P2, the lookup function 40 of the protocol engine applies in a way identical to the one which would be achieved in response to an incoming cell of the connection received on port P2. Afterwards, the remaining steps of the cell processing are identical to the processing steps already described in reference to FIG. 3.

Figure 6:
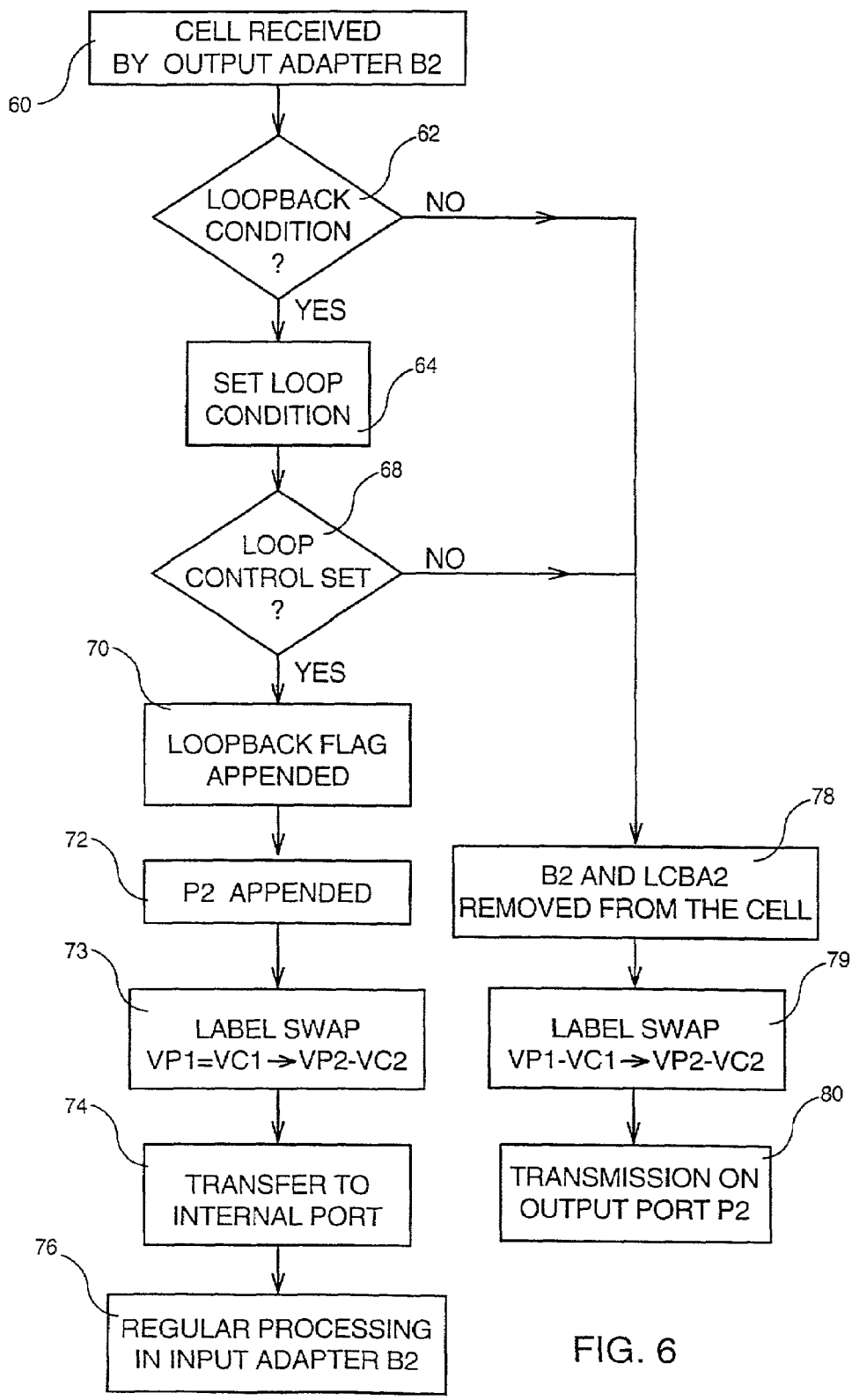
FIG. 6 is a flow chart representing the steps of the method according to the present invention.

The method according to the invention is represented by the flow chart illustrated in FIG. 6. After an incoming cell has been normally processed in adapter B1, it is received by output adapter B2 (step 60). A check is performed (step 62) to determine whether loopback conditions are met. If so, a loop condition bit is set in a register or in the cell buffer control block (step 64). Then, the label lookup function is performed on the appended PEC LCBA2 to find the connection control block which contains the forwarding information, egress port P2 and ATM label VP2-VC2 at egress port, and the loop control bit. If the loop control bit is set (68), a loopback flag is appended to the cell (step 70). Due to the presence of this loopback flag, the SRL B2 and PEC LCBA2 which had been appended to the cell by the protocol engine of input adapter B1, are replaced by the egress port identifier P2 (72), and the ATM label VP1-VC1 is swapped to VP2-VC2 (step 73). Then, the cell is transferred to the input adapter B2 through the internal port of adapter B2 (step 74). In input adapter B2, the cell is processed regularly, i.e. a lookup function is performed on the input port P2 appended to the cell and on the ATM label VP2-VC2, the cell is switched to output adapter B1 and transmitted over the ATM network from output port P1 (step 76). When the cell does not meet loopback conditions or when the loop control bit is not set, the switch routing label B2 and the protocol engine correlator LCBA2 are removed from the cell (step 78), the ATM label is swapped from VP1-VC1 to VP2-VC2 (79) and the cell is transmitted over the network on output port P2 of adapter B2 as all regular cells of the connection (step 80).

What is claimed is:

1. A method of transmitting a loopback cell of a connection established between a source ATM device and a destination ATM device of an ATM network, said loopback cell being returned at one of at least one switching nodes located on the connection route, said loopback cell entering said switching node by an input port of an input adapter, before being switched to an output adapter as would a normal cell of said connection, and being then switched backward to said input adapter and exiting the switching node by said input port of said input adapter instead of an output port of said output adapter as would the normal cell of said connection, said method comprising the steps of;

setting a loop control bit in said output adapter by a control point of said switching node if loopback is permitted in said switching node;

detecting in said output adapter whether an incoming cell includes a loopback condition, and if so appending to said incoming cell a specific routing label indicating that the incoming cell is a cell to be returned on the connection; and using said routing label by a protocol engine on said output adapter to transmit said cell back to said input adapter, then over said ATM network from said input port of said input_adapter like the normal cell traveling on the connection in the opposite direction.

2. The method according to claim 1, wherein said specific routing label is appended to said incoming cell only if the loop control bit is set by the control point of said switching node in said output adapter.

3. The method according to claim 2, wherein said specific routing label is an identification of said output port to indicate to the protocol engine of said output adapter that said incoming cell should be treated as the normal cell of said connection entering into said output port as if it were traveling on the connection in the opposite direction.

4. A method of transmitting a loopback cell of a connection established between a source ATM device and a destination ATM device of an ATM network, said loopback cell being returned at one of at least one switching nodes located on the connection route, said loopback cell entering said switching node by an input port of an input adapter, before being switched to an output adapter as would a normal cell of said connection, and being then switched backward to said input adapter and exiting the switching node by said input port of said input adapter instead of an output port of said output adapter as would the normal cell of said connection, said method comprising the steps of;

detecting in said output adapter whether an incoming cell includes a loopback condition, and if so appending a loopback flag to said incoming cell if a loop control bit is set in order to indicate to the protocol engine of said output adapter that said identification of said output port has to be appended to said incoming cell;

appending to said incoming cell a specific routing label indicating that the incoming cell is a cell to be returned on the connection; and using said routing label by a protocol engine of said output adapter to transmit said cell back to said input adapter, then over said ATM network from said input port of said input adapter like the normal cell traveling on the connection in the opposite direction wherein said specific routing label is appended to said incoming cell only if the loop control bit is set by the control point of said switching node in said output adapter and said specific routing label is an identification of said output port to indicate to the protocol engine of said output adapter that said incoming cell should be treated as the normal cell of said connection entering into said output port as if it were traveling on the connection in the opposite direction.

5. The method according to claim 4, wherein said incoming cell to be looped back is transferred by said protocol engine of said output adapter to an internal port of said output adapter, said internal port being only used for incoming cells when said loopback flag is appended to said incoming cell.

6. The method according to claim 5, wherein said internal port is used as a second input port of said output adapter for receiving said incoming cell to be looped back, which cell is treated as the normal cell of the connection entering said output port in view of said identification of said output port appended thereto.

7. A system for transmitting a loopback cell of a connection established between a source ATM device and a destination ATM device of an ATM network, said loopback cell being returned at one of at least one switching nodes located on the connection route, said loopback cell entering said switching node by an input port of an input adapter, before being switched to an output adapter as would a normal cell of said connection, and being then switched backward to said input adapter and exiting the switching node by said input_port of said input adapter instead of an output port of said output adapter as would the normal cell of said connection, said system comprising:

means in said switching node for setting a loop control bit in said output adapter if loopback is permitted in said switching node;

means for detecting in said output adapter by a control point whether an incoming cell includes a loopback condition;

means for appending to any incoming cell which includes said loopback condition a specific routing label indicating that the incoming cell is a cell to be returned on the connection; and means for using said routing label by a protocol engine on said output adapter to transmit said cell back to said input adapter, then over said ATM network from said input port of said input adapter like the normal cell traveling on the connection in the opposite direction.

8. The system according to claim 7, wherein said specific routing label is an identification of said output port to indicate to the protocol engine of said output adapter that said incoming cell should be treated as the normal cell of said connection entering into said output port as if it were traveling on the connection in the opposite direction.

9. A system for transmitting a loopback cell of a connection established between a source ATM device and a destination ATM device of an ATM network, said loopback cell being returned at one of at least one switching nodes located on the connection route, said loopback cell entering said switching node by an input port of an input adapter, before being switched to an output adapter as would a normal cell of said connection, and being then switched backward to said input adapter and exiting the switching node by said input port of said input adapter instead of an output port of said output adapter as would the normal cell of said connection, said system comprising:

means for detecting in said output adapter whether an incoming cell includes a loopback condition;

means for appending to any incoming cell which includes said loopback condition a specific routing label indicating that the incoming cell is a cell to be returned on the connections wherein said specific routine label is appended to said incoming cell only if a loop control bit is set by a control point of said switching node in said output adapter and said specific routing label is an identification of said output port to indicate to a protocol engine of said output adapter that said incoming cell should be treated as the normal cell of said connection entering into said output port as if it were traveling on the connection in the opposite direction;

means to append a loopback flag to said incoming cell if said loop control bit is set in order to indicate to the protocol engine of said output adapter that said identification of said output port has to be appended to said incoming cell; and means for using said routing label by the protocal engine of said output adapter to transmit said cell back to said input adapter, then over said ATM network from said input port of said input adapter like the normal cell traveling on the connection in the opposite direction.

10. The system according to claim 9, wherein said incoming cell to be looped back is transferred by said protocol engine of said output adapter to an internal port of said output adapter, said internal port being only used for incoming cells when said loopback flag is appended to said incoming cell.

11. The system according to claim 10, wherein said internal port is used as a second input port of said output adapter for receiving said incoming cell to be looped back, which cell is treated as the normal cell of the connection entering said output port in view of said identification of said output port appended thereto.

* * * * *